(12) United States Patent
Adelgren et al.

(10) Patent No.: US 11,651,343 B2
(45) Date of Patent: May 16, 2023

(54) SYSTEMS AND METHOD FOR PAYMENT TRANSACTION PROCESSING WITH PAYMENT APPLICATION DRIVER

(71) Applicant: PowerPay, LLC, Atlanta, GA (US)

(72) Inventors: Darren Adelgren, Morrison, CO (US); Peter Osberg, Golden, CO (US)

(73) Assignee: PowerPay, LLC, Atlanta, GA (US)

( * ) Notice: Subject to any disclaimer, the term of this patent is extended or adjusted under 35 U.S.C. 154(b) by 663 days.

(21) Appl. No.: 15/641,754

(22) Filed: Jul. 5, 2017

(65) Prior Publication Data

US 2018/0012213 A1 Jan. 11, 2018

Related U.S. Application Data

(60) Provisional application No. 62/358,745, filed on Jul. 6, 2016.

(51) Int. Cl.
*G06Q 20/20* (2012.01)
*G06Q 20/38* (2012.01)
*H04L 9/40* (2022.01)

(52) U.S. Cl.
CPC ........... *G06Q 20/204* (2013.01); *G06Q 20/20* (2013.01); *G06Q 20/3823* (2013.01); *G06Q 20/3829* (2013.01); *H04L 63/083* (2013.01); *H04L 63/0823* (2013.01); *H04L 63/166* (2013.01)

(58) Field of Classification Search
CPC .. G06Q 20/20; G06Q 20/204; G06Q 20/3823; G06Q 20/3829; G06F 21/45; H04L 63/061; H04L 63/0823; H04L 63/083; H04L 63/166
See application file for complete search history.

(56) References Cited

U.S. PATENT DOCUMENTS

| | | | |
|---|---|---|---|
| 9,916,567 B1 * | 3/2018 | Baar | G06Q 20/38215 |
| 10,997,592 B1 * | 5/2021 | Kurani | G06Q 20/3821 |
| 2009/0037284 A1 * | 2/2009 | Lewis | G06Q 20/202 |
| | | | 705/16 |

(Continued)

FOREIGN PATENT DOCUMENTS

WO WO-2015015406 A1 * 2/2015 ............. G06Q 20/00

*Primary Examiner* — Courtney P Jones

(74) *Attorney, Agent, or Firm* — Foley & Lardner LLP

(57) ABSTRACT

A pre-certified payment application driver code configured to satisfy requirements of a particular level of a credit card data security certification compliance may be integrated with first and second POS applications to generate first and second integrated applications, respectively, as a fully integrated, tested and production-ready solution. Each integrated application meets all levels of data security compliance requirements and enables data security-compliant transactions with end-to-end encryptions by enabling, in response to a POS application initiating a payment transaction, a payment terminal to share an encryption key with a payment server. Each integrated application can receive payment data encrypted with the encryption key, transmit the encrypted payment data to the payment server for processing the payment transaction using the encrypted payment data, and receive a processing result of the payment transaction from the payment server and communicate the processing result to the POS application.

27 Claims, 7 Drawing Sheets

(56) References Cited

U.S. PATENT DOCUMENTS

| | | | | |
|---|---|---|---|---|
| 2011/0295753 | A1* | 12/2011 | Reno | H04L 9/3234 |
| | | | | 705/72 |
| 2013/0198086 | A1* | 8/2013 | Mardikar | G06Q 20/1085 |
| | | | | 705/71 |
| 2014/0012762 | A1* | 1/2014 | Glatt | G06Q 20/18 |
| | | | | 705/65 |
| 2014/0222545 | A1* | 8/2014 | Hajji | G06Q 20/202 |
| | | | | 705/14.38 |
| 2014/0324698 | A1* | 10/2014 | Dolcino | G06Q 20/409 |
| | | | | 705/44 |
| 2014/0372320 | A1* | 12/2014 | Goldfarb | G07F 7/1033 |
| | | | | 705/72 |
| 2015/0363765 | A1* | 12/2015 | Alimi | G06Q 20/202 |
| | | | | 705/44 |
| 2016/0034876 | A1* | 2/2016 | Speiser | G06Q 20/384 |
| | | | | 705/21 |
| 2016/0210617 | A1* | 7/2016 | Leger | G06Q 20/38215 |
| 2017/0068957 | A1* | 3/2017 | Webster | G06Q 20/401 |
| 2017/0351889 | A1* | 12/2017 | Govindarajan | G06K 7/10465 |
| 2018/0007037 | A1* | 1/2018 | Reese | H04L 63/0838 |
| 2018/0018661 | A1* | 1/2018 | Murphy | G06Q 20/3278 |
| 2018/0144321 | A1* | 5/2018 | Baar | G06Q 20/382 |

* cited by examiner

SYSTEMS AND METHOD FOR PAYMENT TRANSACTION PROCESSING WITH PAYMENT APPLICATION DRIVER

CROSS-REFERENCE TO RELATED APPLICATION

This application claims the benefit of and priority to U.S. Provisional Application No. 62/358,745, entitled "Systems and Method for Payment Transaction Processing With Payment Application Driver," filed Jul. 6, 2016. U.S. Provisional Application No. 62/358,745 is hereby incorporated by reference herein in its entirety.

TECHNICAL FIELD

The present disclosure relates to systems and methods for payment transaction processing and more particularly to systems and methods for payment transaction processing using a payment application driver.

BACKGROUND

EMV, named after the organizations that created the technology standard—Europay, MasterCard and Visa—is a technical standard for the interaction between chip-based smart cards and approved payment devices. The purpose of the EMV specifications is to facilitate the worldwide interoperability and acceptance of secure payment transactions. During a card-present payment transaction, payment data securely stored on a microchip can either be embedded in a traditional plastic card or mobile device. EMV devices are able to read data stored on a chip within the card. By using chips as an active part of the payment transaction, EMV cards and devices help prevent credit card fraud from stolen account numbers, cloned payment cards and other security and fraud threats. Each chip-based card is embedded with encrypted data. During the transaction authorization process, the encrypted data in the card is used to verify the card's authenticity. Strong cryptographic functions are used to authenticate the card and cardholder to ensure validity. Some third party providers provide a point-to-point encryption (P2PE) solution that is a combination of secure devices, applications and processes that encrypt data from the point of interaction (for example, at the point of swipe or dip) until the data reaches the solution provider's secure decryption environment.

The EMV standards define the interaction at the physical, electrical, data and application levels between EMV cards and EMV card processing devices. There are three levels of EMV certification: level 1—hardware/terminal certification; level 2—kernel certification; and level 3—payment application certification. Level 1 certification covers the physical interface between the card acceptance terminal and the EMV card. Terminal vendors are responsible for the level 1 certification. Level 2 certification covers the software interface between the card acceptance terminal and the chip card. Terminal vendors are also responsible for the level 2 certification. Level 3 certification covers the software interface between a point of sale (POS) application and the card acceptance terminal. Software vendors are responsible for the level 3 certification.

The Payment Card Industry Data Security Standard (PCI DSS) is a proprietary information security standard for organizations that handle branded credit cards from the major card schemes. The PCI Standard is mandated by the card brands and administered by the Payment Card Industry Security Standards Council. The standard was created to increase controls around cardholder data to reduce credit card fraud. Validation of compliance is performed annually, either by an external Qualified Security Assessor (QSA) or by Self-Assessment Questionnaire (SAQ) for companies handling smaller volumes.

SUMMARY

In one aspect, a system is presented including a pre-certified payment application driver code that meets requirements of a particular level of a credit card data security certification compliance (e.g., end-to-end (E2E) or network operations as required by EMV level 3 certification). The pre-certified payment application driver code can be an application programming interface (API) or a shared library stored in a memory. The payment application driver can be pre-certified by, for example, testing the end-to-end (E2E) or network operations over all possible combinations of each payment terminal, each device a POS application (as integrated with the payment application driver code) is using, each version of the POS application, each payment server, and each card network. This pre-certified payment application driver code can be easily integrated with a POS application on general computing devices, including mobile devices. The pre-certified payment application driver code can help an independent software vendor (ISV) to get their application to market much quicker, cheaper, and in a secure manner by removing the need for the ISV to perform the EMV level 3 certification process, which would take, for example, several months to complete and incur significant cost.

In one aspect, a system is presented including a processor, a memory, and a pre-certified payment application driver code executable by the processor and configured to satisfy requirements of a particular level of a credit card data security certification compliance. The pre-certified payment application driver code can be integrated with a first point of sale (POS) application to generate a first integrated application executing on the processor with the memory. The first integrated application can be configured to enable, in response to the first POS application initiating a first payment transaction, a first payment terminal to share a first encryption key with a payment server, receive first payment data encrypted with the first encryption key, transmit the encrypted first payment data to the payment server for processing the first payment transaction using the encrypted first payment data, and receive a processing result of the first payment transaction from the payment server and communicate the processing result to the first POS application. The first integrated application can be configured to perform operations as required by the particular level of the credit card data security certification compliance.

BRIEF DESCRIPTION OF THE DRAWINGS

The above and related objects, features, and advantages of the present disclosure will be more fully understood by reference to the following detailed description, when taken in conjunction with the following figures, wherein.

DETAILED DESCRIPTION

Figure 1:
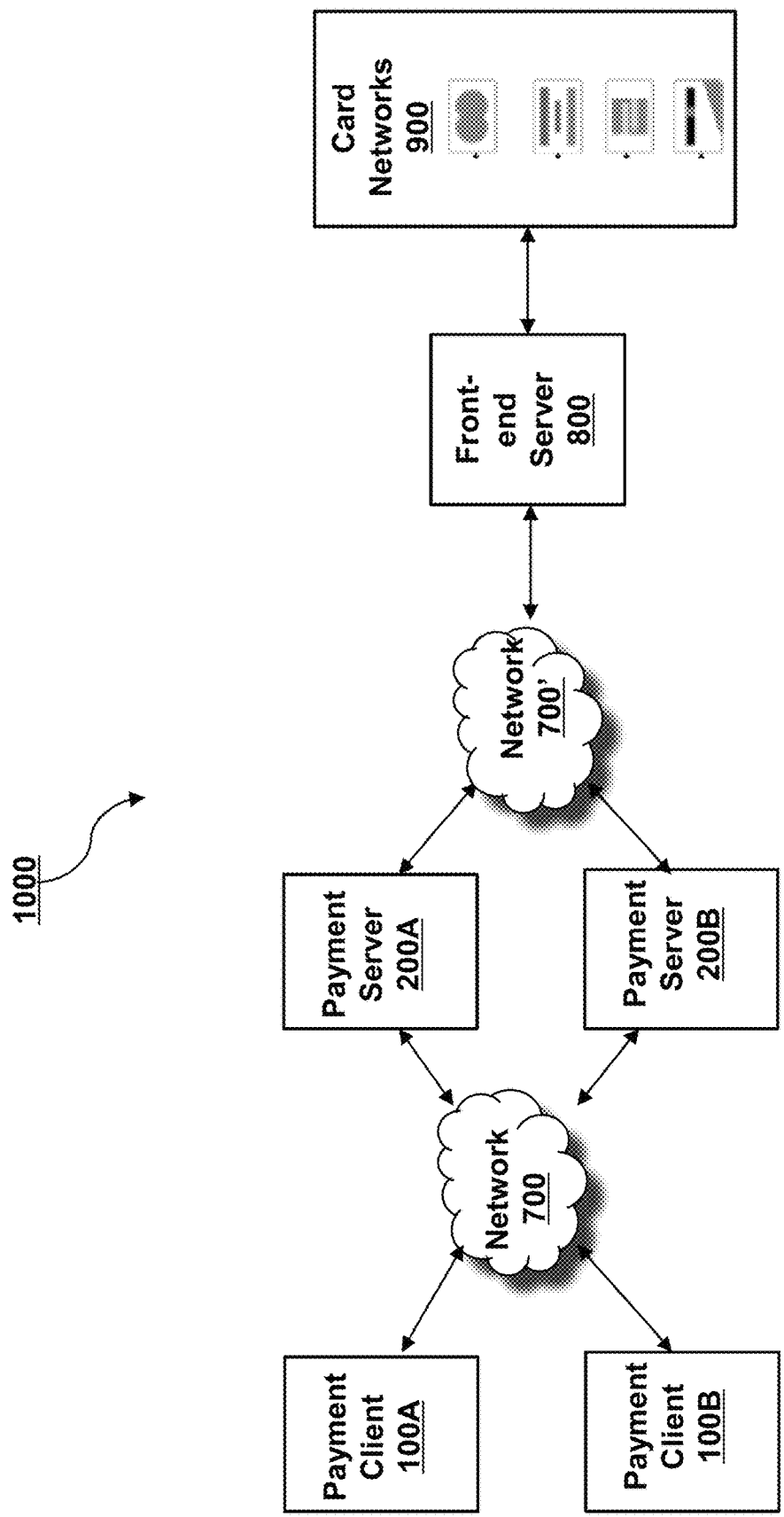
FIG. 1 is a block diagram of a network environment with a payment client system and a payment server according to some implementations.

Presented are systems and methods related to payment transaction processing and more particularly to payment transaction processing using a payment application driver. In some implementations, a payment application driver code can be integrated with a point of sale (POS) application to produce an integrated application which meets the EMV level-3 certification requirements. The payment application driver code can benefit POS developers by reducing or removing the cost of a data security standard (e.g., Payment Card Industry Payment Application Data Security Standard (PCI PA-DSS)) compliance assessment and validation, thus providing an increased value proposition to their clients. When payment application driver code is properly integrated with a developed POS application, if no cardholder data is stored in their environment (e.g., in the POS application), then the third-party application can remain out of scope of PA-DSS validation requirements, thus reducing or removing the cost of a PCI PA-DSS compliance assessment and validation. As indicated by a test result to be presented in a later section, during the operations of an application with the payment application driver code integrated therein, no cardholder data was discovered at rest on the device nor while in transmit. That is, the payment application driver code can be configured not to negatively impact a merchant's PCI DSS compliance. In some implementations, the pre-certified payment application driver code can help an independent software vendor (ISV) to get their application to market much quicker, cheaper, and in a secure manner. In some implementations, the pre-certified payment application driver code can speed the time to market by removing the need for the ISV to perform the EMV level 3 certification process. Without such pre-certified payment application driver code, the EMV level 3 certification process would take, for example, 8-12 weeks to complete and cost more than $22,000 payable directly to the major card brands (e.g., Visa, MasterCard, AmEx, Discover) that the ISV would have to pay. With the pre-certified payment application driver code of the present disclosure, the ISV can integrate in as little as 3 days, for example, and complete a validation script in 1 day, for example, thus be ready to go to market in around 4 days, for example, with no extra certification costs to the ISV.

In some implementations, the pre-certified payment application driver code can have multiple technical benefits, for example, more simplicity and easiness, more flexibility, and more security, in configuring a payment transaction processing system. For example, this pre-certified payment application driver code can be an application programming interface (API) or a shared library stored in a memory, thus allowing for simple and easy integration with a POS application on general computing devices, including mobile devices. Moreover, in some implementations, the pre-certified payment application driver code can implement configurable authentication identifiers as an API or shared library, thus allowing for flexible configuration of an authentication scheme of the payment transaction processing system. In some implementations, the pre-certified payment application driver code can configure the authentication scheme to use the same authentication identifier across all implementations of the pre-certified payment application driver code (e.g., using the same authentication identifier across all POS applications each of which is integrated with the pre-certified payment application driver code), or use authentication identifiers for individual ISVs, or use authentication identifiers for individual merchants, or use authentication identifiers for individual applications. Furthermore, in some implementations, the pre-certified payment application driver code can implement a Point to Point Encryption (P2PE) technology as an API or shared library, thus allowing for secure configuration of transmission of all data that enter a payment terminal. In some implementations, encryption keys are injected into every payment terminal that the pre-certified payment application driver code supports. In some implementations, the payment terminals then encrypt all card data that enters that payment terminal whether the card is inserted, tapped, swiped, or manually keyed. In some implementations, the information then flows from the terminal through the pre-certified payment application driver code to a payment server in an encrypted format that cannot be decrypted while the message is in flight.

FIG. 1 is a block diagram of an example network environment 1000 with payment clients 100A and 100B, back-end payment servers 200A and 200B, a front-end server 800 and card networks 900. In broad overview, the illustrated network environment includes a network 700 of interconnected network nodes (e.g., payment clients and payment servers) and a network 700' of interconnected network nodes (e.g., payment servers and front-end servers). In some implementations, the network 700 is the same network as the network 700'. The network nodes participate in the network 700 or 700' as data sources, data destinations (or data sinks), and intermediary nodes propagating data from sources towards destinations through the network 700 or 700'. Referring to FIG. 1 in more detail, the network 700 or 700' is a network facilitating interactions between participant devices. An illustrative example network 700 or 700' is the Internet; however, in other implementations, the network 700 may be another network, such as a local network within a data center, a network fabric, or any other local area or wide area network. The network 700 or 700' may be composed of multiple connected sub-networks or autonomous networks. The network 700 or 700' can be a local-area network (LAN), such as a company intranet, a metropolitan area network (MAN), a wide area network (WAN), an inter-network such as the Internet, or a peer-to-peer network, e.g., an ad hoc WiFi peer-to-peer network. Any type and/or form of data network and/or communication network can be used for the network 700 or 700'. It can be public, private, or a combination of public and private networks. In general, the network 700 or 700' is used to convey information between computing devices, e.g., payment clients 100A and 100B, payment servers 200A and 200B, and the front-end (payment) server 800.

Referring to FIG. 1, each of the payment clients 100A and 100B can belong to a merchant and receive payment data relating to a particular transaction (e.g., data of credit card information and payment information) and communicate with a back-end payment server (e.g., the payment servers 200A and 200B) for processing the particular transaction. In some implementations, each of the payment clients 100A and 100B can have configurations of payment client systems 100A and 100B as shown in FIGS. 2A and 2B, respectively.

Figure 2A:
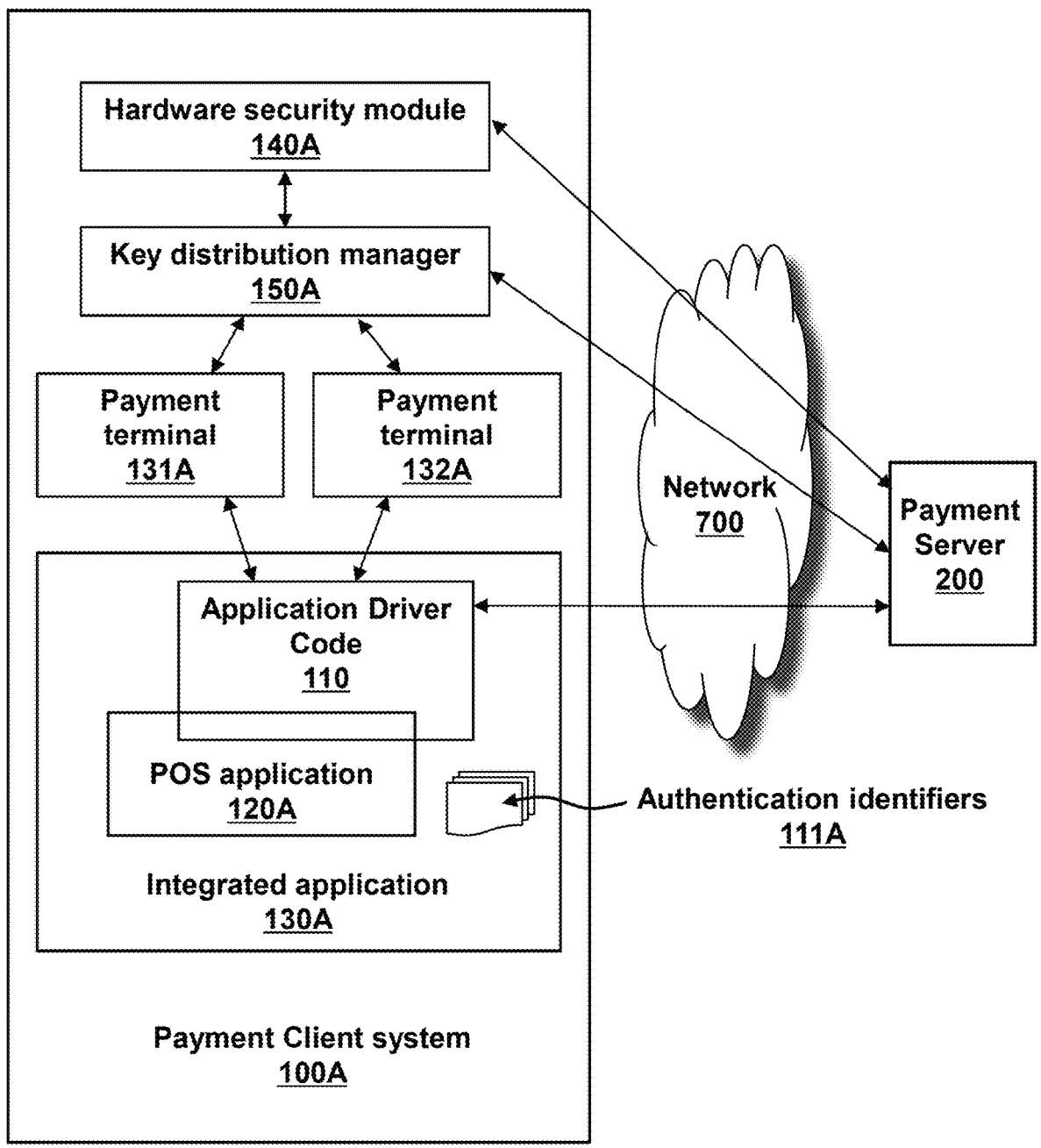
FIG. 2A is a block diagram of an example payment client system.
Figure 2B:
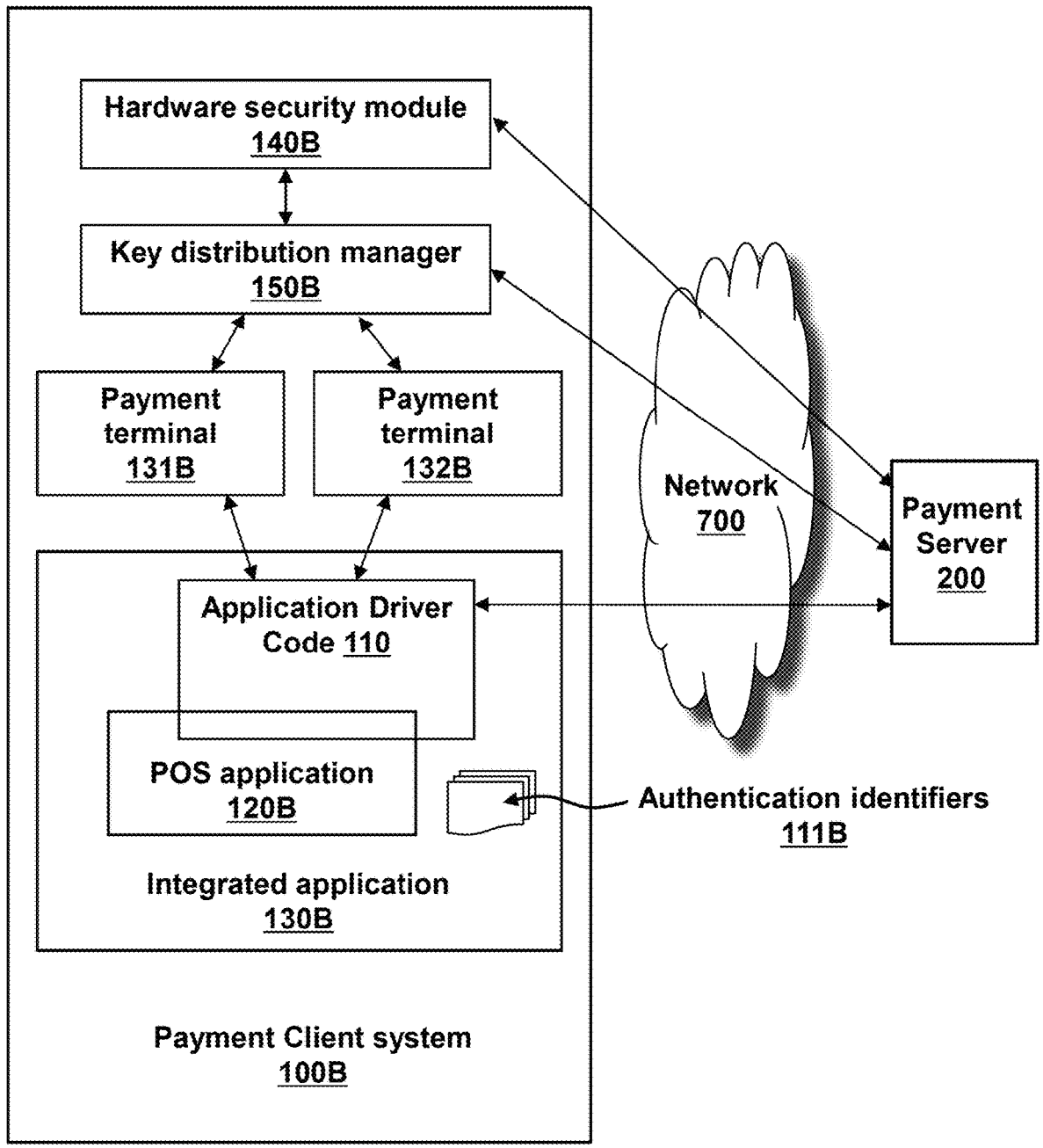
FIG. 2B is a block diagram of an example payment client system.
Figure 3:
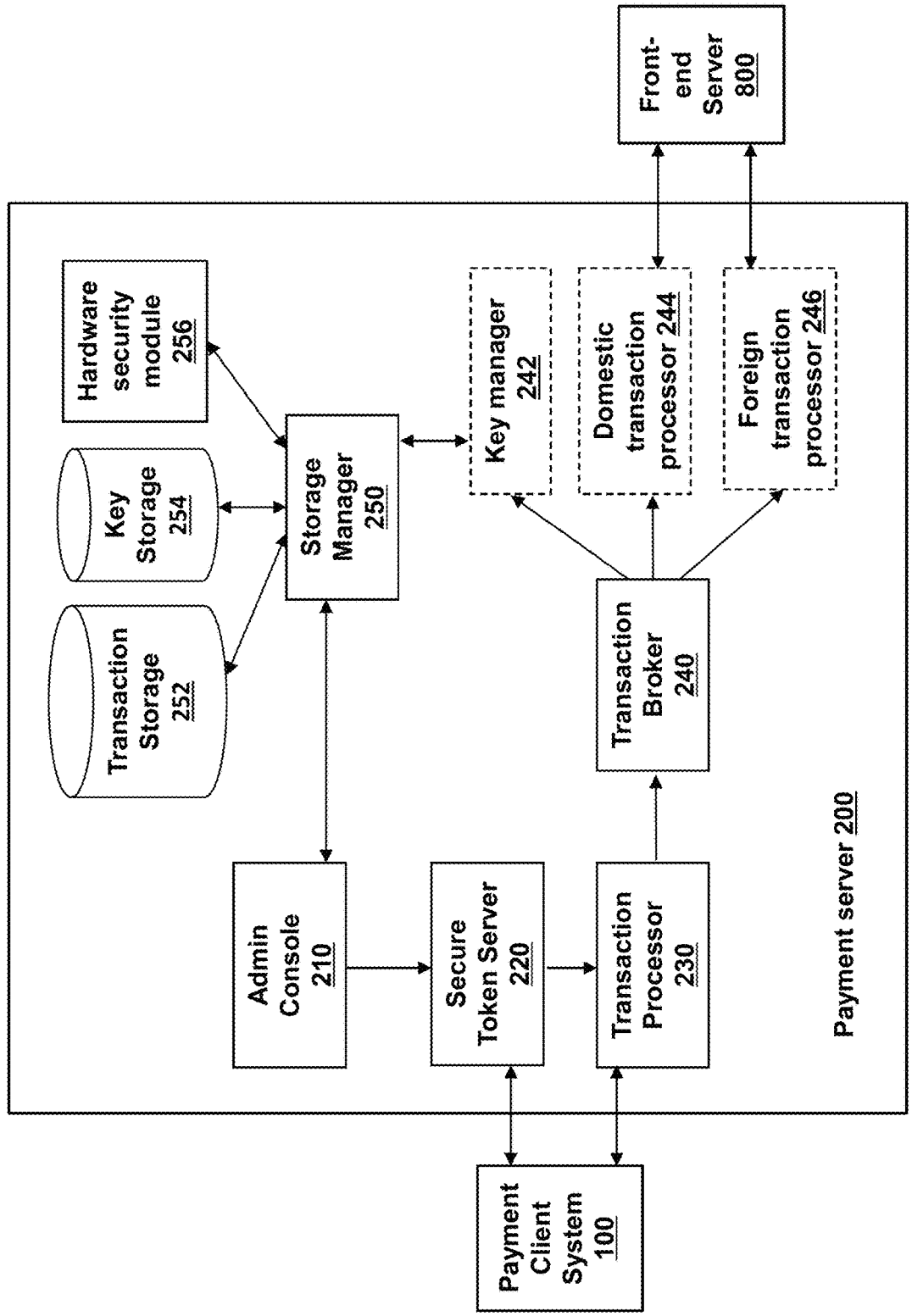
FIG. 3 is a block diagram of an example payment server.
Figure 4:
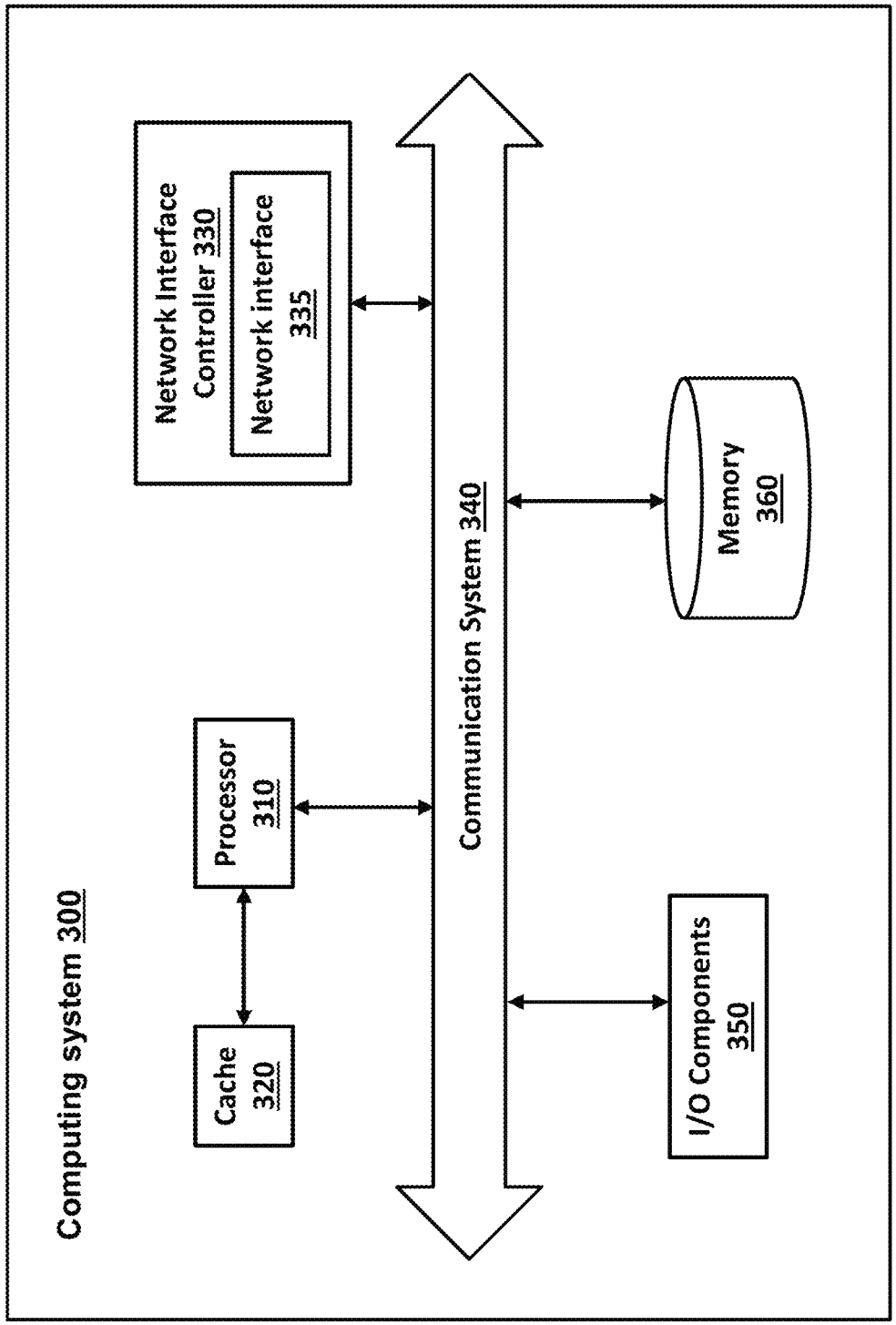
FIG. 4 is a block diagram of an example computing system.

In some implementations, each of the payment servers 200A and 200B can have a configuration of a payment server 200 as shown in FIG. 3. In some implementations, the back-end payment server can receive a transaction processing request from the payment clients, communicate with front-end payment servers (e.g., the front-end server 800), and accept settlements from the front-end payment servers. In some implementations, front-end payment servers can connect to various card networks (e.g., the card networks 900) and supply authorization and settlement services to the payment clients of the merchants via the back-end payment servers. In some implementations, the payment client system 100 has configuration similar to that of a computing system 300 as shown in FIG. 4. The computing system 300 is described in more detail below, in reference to FIG. 4. The elements shown in the computing system 300 illustrated in FIG. 4 do not all need to be present in some implementations of the payment client systems 100A and 100B illustrated in FIGS. 2A and 2B, respectively.

Referring to FIG. 2A, the payment client system 100A includes an integrated is application 130A and one or more payment terminal (e.g., a payment terminal 131A and a payment terminal 132A). For example, in some implementations, the integrated application 130A can be executed on a computer (e.g., a computer of a cash register) to which a payment terminal is connected as a peripheral device. In some implementations, the integrated application 130A can be executed on the payment terminal (e.g., executed as a mobile application on a mobile device as a mobile payment terminal). In some implementations, the integrated application 130A can be executed on a computer server which can be accessed through a wired or wireless connection by each payment terminal (e.g., each payment terminal of a corresponding cash register) as a computer client. In some implementations, the payment terminals can include MagTek® card readers (e.g., DynaPro, DynaPro Mini) and Ingenico terminals (e.g., iPP320, iPP520, iCMP, iSMP) and EVO card readers (e.g., CSwiper, Chipper). The payment terminal can include a card reader, a key entry (e.g., keypad) and a display. In some implementations, the payment terminal can be implemented in digital electronic circuitry, or in computer software embodied on a tangible medium, firmware, or hardware. The payment terminal can include a card reader that reads data from a card-shaped storage medium to input payment data (e.g., credit card or debit information) and/or personal identification number (PIN) data. In some implementations, the payment terminal can be a magnetic card reader (MSR) that reads, for example, magnetic stripe credit cards. In some implementations, the payment terminal can be a memory card reader that can read, for example, a smart credit card or an integrated circuit (IC) credit card or a memory card. In some implementations, the payment terminal can read Europay, MasterCard, and Visa (EMV) credit cards. In some implementations, in response to being enabled, the payment terminal can encrypt data read from the credit cards and provide a point-to-point encryption (P2PE). In some implementations, each of the payment terminals 131A and 132A has configuration similar to that of a computing system 300 as shown in FIG. 4. In some implementations, a payment terminal can be a mobile device that has configuration similar to that of a computing system 300 as shown in FIG. 4. The computing system 300 is described in more detail below, in reference to FIG. 4. The elements shown in the computing system 300 illustrated in FIG. 4 do not all need to be present in some implementations of the payment terminals 131A and 132A illustrated in FIG. 2A.

Referring to FIG. 2A, in some implementations, the payment client system 100A includes a hardware security module (HSM) 140A. The HSM 140A can manage digital cryptographic keys and provide cryptographic processing (e.g., encryption and decryption). The HSM 140A can be implemented in digital electronic circuitry, or in computer software embodied on a tangible medium, firmware, or hardware. In some implementations, the HSM 140A can communicate with a payment server 200 (see FIG. 3) to exchange an encryption key that is to be used to encrypt payment data. In some implementations, the payment client system 100A can include a key distribution manager 150A that receives from a payment server 200 (see FIG. 3) an encryption key. In some implementations, the distribution manager 150A can store the received encryption key into the HSM 140A or distribute the received encryption key to the payment terminals 131A and 132A. The key distribution manager 150A can be implemented in digital electronic circuitry, or in computer software embodied on a tangible medium, firmware, or hardware.

Referring to FIG. 2A, the integrated application 130A can be executed on a processor (e.g., a processor 310 in FIG. 4) with a memory (e.g., a memory 360 in FIG. 4). The integrated application 130A can be generated by integrating a payment application driver code 110 with a point of sale (POS) application 120A. In some implementations, the payment application driver code 110 is a pre-certified payment application driver code configured to satisfy requirements of a particular level of a credit card certification compliance (e.g., EMV level 3 certification). For example, referring to FIG. 2A, the pre-certified payment application driver code 110 meets requirements of the EMV level 3 certification. In some implementations, the pre-certified payment application driver code 110 meets requirements of end-to-end (E2E) or network operations as required by EMV level 3 certification. In some implementations, the pre-certified payment application driver code 110 has met requirements of end-to-end (E2E) or network operations as required by EMV level 3 certification by testing the end-to-end (E2E) or network operations over all possible combinations of each payment terminal, each device a POS application (as integrated with the payment application driver code 110) is using, each version of the POS application, each payment server, and each card network.

Referring to FIG. 2A, in some implementations, the payment application driver code 110 is an application programming interface (API). In some implementations, the API can provide API calls or functions including login, authorization, capture, authorization and capture with duplicate transaction override, resubmission, transaction lookup, void with forced void, batch capture with forced void, and local settings file with authentication parameters. In some implementations, the API can provide as authorization methods, a chip and personal information number (PIN) method and a chip and signature method. In some implementations, the API can provide API calls or functions of network interfaces including Bluetooth, universal serial bus (USB), Ethernet and wireless networks. In some implementations, the API can provide API calls or functions of managing payment cards including smart chip cards, magnetic stripe cards, near field communication (NFC) capable cards, and PIN capable cards. In some implementations, the API can provide API calls or functions of a point-to-point encryption (P2PE) open algorithm. In some implementations, the payment application driver code 110 as a portion of the integrated application 130A is a shared library stored in a memory (e.g., a memory 360 in FIG. 4). In some implementations, the API can provide API calls or functions of getting or setting security questions. In some implementations, the API can provide API calls or functions of resetting a password when a password is forgotten.

Referring to FIG. 2A, in some implementations, the payment application driver code 110 supports not only bank card transactions (e.g., credit/debit card transactions) but also an additional payment class of stored value account (or closed loop gift card). For example, in some implementations, the payment application driver code 110 allows a merchant to support a merchant branded gift card program within their payment application.

Referring to FIG. 2A, in some implementations, the payment application driver code 110 shares an authentication identifier across all implementations of the pre-certified payment application driver code (e.g., using the same authentication identifier across all POS applications each of which is integrated with the pre-certified payment application driver code). In some implementations, the payment application driver code 110 provides (different) authentication identifiers for individual independent software vendors (ISVs) so as to track those ISVs by the authentication identifiers. In some implementations, the payment application driver code 110 provides (different) authentication identifiers for individual merchants so as to track those individual merchants by the authentication identifiers. For example, referring to FIGS. 2A and 2B, if the payment client systems 100A and 100B are provided by different ISVs or different merchants, the payment application driver code 110 provides different authentication identifiers 111A and 111B for the payment client systems 100A and 100B, respectively. In some implementations, the authentication identifiers can be applied at an application level that is used for authentication to a payment server. For example, the authentication identifiers 111A include multiple authentication identifies for different applications that are integrated with the payment application driver code 110 (even when those applications are provided by the same ISV or same merchant) so as to track different applications by the authentication identifiers. In some implementations, the payment application driver code 110 can configure the authentication scheme to (1) use the same authentication identifier across all implementations of the pre-certified payment application driver code, or (2) use authentication identifiers for individual ISVs, or (3) use authentication identifiers for individual merchants, or (4) use authentication identifiers for individual applications. In some implementations, the payment application driver code 110 can include configurable authentication identifiers as an API or shared library to selectively implement (1) an authentication scheme to use the same authentication identifier across all implementations of the pre-certified payment application driver code, or (2) an authentication scheme to use authentication identifiers for individual ISVs, (3) an authentication scheme to use authentication identifiers for individual merchants, or (4) an authentication scheme to use authentication identifiers for individual applications.

Referring to FIG. 2A, in some implementations, the payment application driver code 110 performs a terminal services management that sends updates automatically to a terminal that has been deployed into the field. In some implementations, the terminal services management supports updates including update of terminal configuration files, update of terminal floor limits, update of terminal processing features, or update of terminal for white labeling/merchant branding.

Referring to FIG. 2B, the payment client system 100B can have a configuration similar to that of the payment client system 100A (see FIG. 2A). That is, in some implementations, the payment client system 100B includes an integrated application 130B, one or more payment terminals (e.g., a payment terminal 131B and a payment terminal 132B), an HSM 140B, and a key distribution manager 150B. Each of the integrated application 130B, payment terminal 131B, payment terminal 132B, HSM 140B, and the key distribution manager 150B can have similar configuration to that of the integrated application 130A, payment terminal 131A, payment terminal 132A, HSM 140A, and key distribution manager 150A, respectively. In some implementations, referring to FIG. 2B, the integrated application 130B can be executed on a processor (e.g., a processor 310 in FIG. 4) with a memory (e.g., a memory 360 in FIG. 4). The integrated application 130B can be generated by integrating the payment application driver code 110 with a point of sale (POS) application 120B.

Referring to FIG. 3, in some implementations, the payment server 200 includes an administration console 210, a secure token server 220, a transaction processor 230, a transaction broker 240 and a storage manager 250, each of which can be implemented in digital electronic circuitry, or in computer software embodied on a tangible medium, firmware, or hardware. The administration console 210 can be used by a system administrator to manage a control flow of processing payment transactions. In some implementations, the secure token server 220 can operate as a key management endpoint from which an encryption key is injected into an HSM of a payment client system. In some implementations, the secure token server 220 can operate as a sign-on endpoint to accept or reject a sign-on request from a payment client system. The transaction processor 230 can provide transaction processing services to payment client systems and operate as a transaction endpoint to which a request for processing a transaction is sent from a payment client system. The transaction broker 240 can receive an authorization request for a particular payment transaction and access to multiple payment processing networks for authorization of the particular payment transaction. The storage manager 250 can manage storages, for example, a transaction storage 252, a key storage 254 and a key hardware security module (HSM) 256. In some implementations, the transaction storage 252 stores data relating to payment transactions other than digital cryptographic keys used for transactions. The key storage 254 can store digital cryptographic keys used for transactions. The HSM 256 can be a computing device or software that manages digital cryptographic keys (e.g., digital cryptographic keys stored in the key storage 254) via the storage manager 250 and provide cryptographic processing (e.g., encryption and decryption). In some implementations, the HSM 256 can communicate with the payment client system 100 or the front-end payment server 800 (see FIGS. 1 and 3) to exchange an encryption key that is to be used to encrypt payment data.

Referring to FIG. 3, in some implementations, the payment server 200 includes a key manager 242, a domestic transaction processor 244 or a foreign transaction processor 246, each of which can be implemented in digital electronic circuitry, or in computer software embodied on a tangible medium, firmware, or hardware. The key manager 242 can manage cryptographic keys, for example, generation, exchange, storing, use and replacement of cryptographic keys. In some implementations, the key manager 242 can use a specific key management scheme, e.g., Derived Unique Key Per Transaction (DUKPT). The domestic transaction processor 244 can perform transaction processing specific for domestic compliance (e.g., applying domestic transaction fees). In some implementations, the domestic transaction processor 244 can perform US specific transaction processing. The foreign transaction processor 246 can perform transaction processing specific for foreign compliance (e.g., applying foreign transaction fees). In some implementations, the foreign transaction processor 246 can perform European Union (EU) specific transaction processing.

Referring to FIG. 3, in some implementations, the payment server 200 has a configuration similar to that of a computing system 300 as shown in FIG. 4. The computing system 300 is described in more detail below, in reference to FIG. 4. The elements shown in the computing system 300 illustrated in FIG. 4 do not all need to be present in some implementations of the payment server 200 illustrated in FIG. 3.

FIG. 4 is a block diagram of an example computing system 300. The example computing system 300 is suitable for use in implementing the computerized components described herein, in accordance with an illustrative implementation. In broad overview, the computing system 300 includes at least one processor 310 for performing actions in accordance with instructions and one or more memory devices 360 or 320 for storing instructions and data. The illustrated example computing system 300 includes one or more processors 310 in communication, via a communication system 340 (e.g., bus), with memory 360, at least one network interface controller 330 with network interface port 335 for connection to a network (not shown), and other components, e.g., input/output ("I/O") components 350. Generally, the processor(s) 310 will execute instructions received from memory. The processor(s) 310 illustrated incorporate, or are directly connected to, cache memory 320. In some instances, instructions are read from memory 360 into cache memory 320 and executed by the processor(s) 310 from cache memory 320.

In more detail, the processor(s) 310 may be any logic circuitry that processes instructions, e.g., instructions fetched from the memory 360 or cache 320. In many implementations, the processor(s) 310 are microprocessor units or special purpose processors. The computing device 300 may be based on any processor, or set of processors, capable of operating as described herein. The processor(s) 310 may be single core or multi-core processor(s). The processor(s) 310 may be multiple distinct processors.

The memory 360 may be any device suitable for storing computer readable data. The memory 360 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 300 may have any number of memory devices 360.

The cache memory 320 is generally a form of computer memory placed in close proximity to the processor(s) 310 for fast read times. In some implementations, the cache memory 320 is part of, or on the same chip as, the processor(s) 310. In some implementations, there are multiple levels of cache 320, e.g., L2 and L3 cache layers.

The network interface controller 330 manages data exchanges via the network interface 335 (sometimes referred to as network interface ports). The network interface controller 330 handles the physical and data link layers of the OSI model for network communication. In some implementations, some of the network interface controller's tasks are handled by one or more of the processor(s) 310. In some implementations, the network interface controller 330 is part of a processor 310. In some implementations, a computing system 300 has multiple network interfaces 335 controlled by a single controller 330. In some implementations, a computing system 300 has multiple network interface controllers 330. In some implementations, each network interface 335 is a connection point for a physical network link (e.g., a cat-5 Ethernet link). In some implementations, the network interface controller 330 supports wireless network connections and an interface port 335 is a wireless (e.g., radio) receiver/transmitter (e.g., for any of the IEEE 802.11 protocols, near field communication "NFC", Bluetooth, ANT, or any other wireless protocol). In some implementations, the network interface controller 330 implements one or more network protocols such as Ethernet. Generally, a computing device 300 exchanges data with other computing devices via physical or wireless links through the network interface 335. The network interface 335 may link directly to another device or to another device via an intermediary device, e.g., a network device such as a hub, a bridge, a switch, or a router, connecting the computing device 300 to a data network such as the Internet.

The computing system 300 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 300 may include an interface (e.g., a universal serial bus (USB) interface) for connecting input devices, output devices, or additional memory devices (e.g., portable flash drive or external media drive). In some implementations, a computing device 300 includes an additional device such as a co-processor, e.g., a math co-processor can assist the processor 310 with high precision or complex calculations.

Referring to FIGS. 1, 2A, 2B, 3 and 4, in some implementations, a system includes a first processor and a first memory (e.g., a processor 310 and a memory 360 of the payment client system 100A in FIG. 2A), a second processor and a second memory (e.g., a processor 310 and a memory 360 of the payment client system 100B in FIG. 2B), and a payment application driver code (e.g., the application driver code 110 in FIGS. 2A and 2B) executable by at least one of the first processor or the second processor and configured to satisfy requirements of a particular level of a credit card data security certification compliance (e.g., EMV level 3 certification). In some implementations, the payment application driver code (e.g., the application driver code 110) is integrated with a first point of sale (POS) application (e.g., the POS application 120A in FIG. 2A) to generate a first integrated application (e.g., the integrated application 130A in FIG. 2A) executing on the first processor with the first memory. In some implementations, the first integrated application is configured to enable, in response to the first POS application initiating a first payment transaction, a first payment terminal (e.g., the payment terminal 131A in FIG. 2A) to share a first encryption key with a payment server (e.g., the payment server 200 in FIG. 2A). In some implementations, the first integrated application is configured to receive, from the first POS application or from the first payment terminal, first payment data encrypted with the first encryption key, transmit the encrypted first payment data to the payment server for processing the first payment transaction using the encrypted first payment data, and receive a processing result of the first payment transaction from the payment server and communicate the processing result to the first POS application. In some implementations, the payment application driver code (e.g., the application driver code 110 in FIGS. 2A and 2B) is integrated with a second POS application (e.g., the POS application 120B in FIG. 2B) to generate a second integrated application (e.g., the integrated application 130B in FIG. 2B) executing on the second processor with the second memory. In some implementations, the second integrated application is configured to enable, in response to the second POS application initiating a second payment transaction, a second payment terminal (e.g., the payment terminal 131B in FIG. 2B) to share a second encryption key with the payment server (e.g., the payment server 200 in FIG. 2B). In some implementations, the second integrated application is configured to receive, from the second POS application or the second payment terminal, second payment data encrypted with the second encryption key, transmit the encrypted second payment data to the payment server for processing the second payment transaction using the encrypted second payment data, and receive a processing result of the second payment transaction from the payment server and communicate the processing result of the second payment transaction to the second POS application.

In some implementations, the first integrated application (e.g., the integrated application 130A in FIG. 2A) is configured to perform operations as required by a particular level of a credit card data security certification compliance (e.g., EMV level 3 certification), and the second integrated application (e.g., the integrated application 130B in FIG. 2B) is configured to perform operations as required by the same level of the credit card data security certification compliance (e.g., EMV level 3 certification).

In some implementations, the pre-certified payment application driver code (e.g., the pre-certified payment application driver code 110 in FIGS. 2A and 2B) includes configurable authentication identifiers to selectively implement (1) an authentication scheme to use the same authentication identifier across all implementations of the pre-certified payment application driver code, or (2) an authentication scheme to use authentication identifiers for individual ISVs, (3) an authentication scheme to use authentication identifiers for individual merchants, or (4) an authentication scheme to use authentication identifiers for individual applications.

In some implementations, during the transmission of the encrypted first payment data and the reception of the processing result of the first payment transaction, the first integrated application (e.g., the integrated application 130A in FIG. 2A) is further configured to communicate transaction information including the encrypted first payment data with the payment server using a transport layer security (TLS) protocol, and during the transmission of the encrypted second payment data and the reception of the processing result of the second payment transaction, the second integrated application (e.g., the integrated application 130B in FIG. 2B) is further configured to communicate transaction information including the encrypted second payment data with the payment server using a TLS protocol.

In some implementations, the payment application driver code (e.g., the common application driver code 110 in FIGS. 2A and 2B) is an application programming interface (API).

In some implementations, the payment application driver code is a shared library stored in at least one of the first memory (e.g., a memory of the payment client system 100A) or the second memory (e.g., a memory of the payment client system 100B).

In some implementations, in response to enabling the first payment terminal (e.g., the payment terminal 131A in FIG. 2A), the first integrated application (e.g., the integrated application 130A in FIG. 2A) is configured to disable other listener processes in the system from connecting the first payment terminal, and in response to enabling the second payment terminal (e.g., the payment terminal 131B in FIG. 2B), the second integrated application (e.g., the integrated application 130B in FIG. 2B) is configured to disable other listener processes in the system from connecting the second payment terminal. In some implementations, the first integrated application (e.g., the integrated application 130A in FIG. 2A) is configured to maintain the first memory (e.g., a memory of the payment client system 100A) to be free of any decryption keys corresponding to the first encryption key and any unencrypted data of the first payment data, and the second integrated application (e.g., the integrated application 130B in FIG. 2B) is configured to maintain the second memory (e.g., a memory of the payment client system 100B) to be free of any decryption keys corresponding to the second encryption key and any unencrypted data of the second payment data. In some implementations, in response to the first payment terminal (e.g., the payment terminal 131A in FIG. 2A) reading the first payment data, the first integrated application is configured to encrypt the first payment data, and in response to the second payment terminal (e.g., the payment terminal 131B in FIG. 2B) reading the second payment data, the second integrated application is configured to encrypt the second payment data.

In some implementations, the first payment data includes tender data, magnetic card reader (MSR) data, personal identification number (PIN) data, and Europay, MasterCard, or Visa (EMV) data, and the second payment data includes tender data, MSR data, PIN data, or EMV data.

In some implementations, the first integrated application (e.g., the integrated application 130A in FIG. 2A) is configured to cause the first payment terminal (e.g., the payment terminal 131A in FIG. 2A) to share the first encryption key with the payment server via the first HSM (e.g., the HSM 140A in FIG. 2A), and the second integrated application (e.g., the integrated application 130B in FIG. 2B) is configured to cause the second payment terminal (e.g., the payment terminal 131B in FIG. 2B) to share the second encryption key with the payment server via the second HSM (e.g., the HSM 140B in FIG. 2B).

Figure 5:
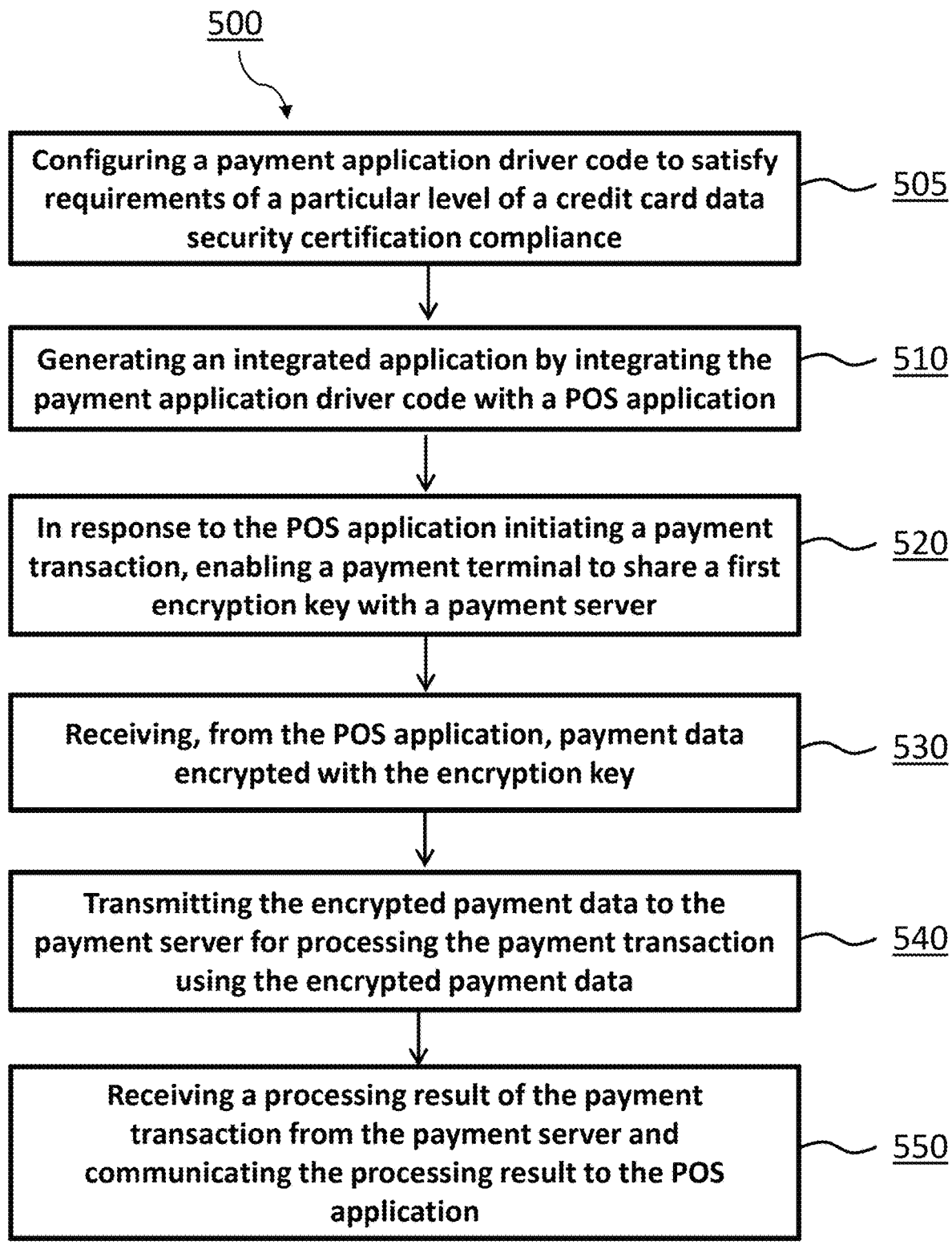
FIG. 5 is a flowchart showing operations of an application generated by integrating a payment application driver and a point of sale (POS) application, according to some implementations.

FIG. 5 is a flowchart for shaping network traffic using an example method 500 performed by an application generated by integrating a payment application driver and a point of sale (POS) application, such as the integrated application 130A shown in FIG. 2A. In broad overview, the method 500 begins with stage 505, where a payment application driver code is configured as a pre-certified payment application driver code to satisfy requirements of a particular level of a credit card certification compliance. In some implementations, the payment application driver code is pre-certified for various payment terminals and POS applications. This allows the driver code to be used for various combinations of terminals and POS applications. At stage 510, a first integrated application executing on a first processor with a first memory is generated by integrating a payment application driver code (such as the payment application driver code 110 shown in FIG. 2A) with a first point of sale (POS) application (such as the POS application 120A shown in FIG. 2A). At stage 520, in response to the first POS application initiating a first payment transaction, the first integrated application can enable a first payment terminal (such as the payment terminal 131A shown in FIG. 2A) to share a first encryption key with a payment server (such as the payment server 200A shown in FIG. 1). At stage 530, the first integrated application can receive, from the first POS application or from the first payment terminal, first payment data encrypted with the first encryption key. At stage 540, the first integrated application can transmit the encrypted first payment data to the payment server for processing the first payment transaction using the encrypted first payment data. At stage 550, the first integrated application can receive a processing result of the first payment transaction from the payment server and communicate the processing result to the first POS application.

Now, the flowchart in FIG. 5 will be described in more detail, referring to FIGS. 1-4.

At stage 505, referring to FIGS. 2A and 2B, a payment application driver code is configured as a pre-certified payment application driver code (e.g., the payment application driver code 110) to satisfy requirements by a particular level of a credit card certification compliance (e.g., EMV level 3 certification). For example, referring to FIG. 2A, the pre-certified payment application driver code 110 meets requirements of the EMV level 3 certification. In some implementations, the pre-certified payment application driver code 110 meets requirements of end-to-end (E2E) or network operations as required by EMV level 3 certification. In some implementations, the pre-certified payment application driver code 110 has met requirements of end-to-end (E2E) or network operations as required by EMV level 3 certification by testing the end-to-end (E2E) or network operations over all possible combinations of each payment terminal, each device a POS application (as integrated with the payment application drive code 110) is using, each version of the POS application, each payment server, and each card network.

At stage 510, referring to FIG. 2A, a first integrated application (e.g., the integrated application 130A) executing on a first processor with a first memory can be generated by integrating a payment application driver code (e.g., the payment application driver code 110) with a first point of sale (POS) application (e.g., the POS application 120A). Similarly, at stage 510, referring to FIG. 2B, a second integrated application (e.g., the integrated application 130B) executing on a second processor with a second memory can be generated by integrating a payment application driver code (e.g., the payment application driver code 110) with a second point of sale (POS) application (e.g., the POS application 120B).

In some implementations, the integration can be initiated by selecting a desired platform (e.g., a particular operating system), network and hardware, in a manner similar to a setup for a direct web services integration. In some implementations, a payment client system (e.g., the payment client system 100A in FIG. 2A) can include an installation module that can provide a user interface for such selection so that the installation module installs the payment application driver code on the payment client system. In some implementations, the payment application driver code can be a software development kit (SDK) that allows the creation of payment applications for POS applications. In some implementations, the SDK can be downloaded appropriate for a selected device manufacturer(s) of the payment client system in a compressed form. Then, the SDK can be uncompressed and a framework file (e.g., a file listing APIs or software libraries in the SDK) can be imported to a project directory of the uncompressed SDK. In some implementations, the SDK can provide a user interface for searching and selecting some APIs or software libraries and adding the selected APIs or software libraries to a project file. In some implementations, the SDK can provide a user interface for adding external accessory protocols key (e.g., an array of strings that identify the communications protocols that the payment application driver code supports) to an information property list file (e.g., "Info.plist" file). In some implementations, a shared library of the payment application driver code can be built based on configuration files (e.g., the framework file, project file and information property list file).

In some implementations, the payment application driver code can support one version of the SDK per payment terminal. In some implementations, one SDK can be provided per operating system per payment terminal, so if there are two payment terminals integrated there will be at least two SDKs per operating system. In some implementations, one SDK can be provided per operating system (e.g., iOS, Android, and Windows) and be all inclusive of all payment terminals being supported. In some implementations, the SDK for the payment application driver code can provide multi-country support for multiple payment terminals with one integration. In some implementations, the SDK for the payment application driver code can function as a container and include an SDK interface that an integrator would use to payment enable their POS to a payment server in an integrated fashion. For example, this "container" can hold multiple terminal controllers. In some implementations, each terminal controller is implemented based on a payment terminal manufacturer so that each terminal controller can support multiple terminal models by that manufacturer. In some implementations, the SDK for the payment application driver code can allow an integrator to integrate with the SDK one time and be able to support multiple terminal vendors, multiple terminal models, and multiple countries all in one integration.

In some implementations, the payment application driver code can be integrated with a POS application by importing APIs of the payment application driver code into source codes of the POS application. In some implementations, the imported APIs can be configured in either using a configuration file (e.g., "configuration.plist" file) or using a data dictionary. Once the APIs are configured, the POS application can invoke API calls by creating transaction data objects in the POS application, passing the transaction data objects to the payment application driver code (e.g., APIs or shared libraries). In response to the POS application invoking the API calls, the payment application driver code can initiate commands in a payment terminal (e.g., the payment terminals 131A and 132A in FIG. 2A), gather tender/EMV data, and send the tender/EMV data to a payment server (e.g., the back-end payment server 200 in FIG. 3). In response to receiving the tender/EMV data, the payment server can send a return response to the payment application driver code with details for a receipt.

In some implementations, the integration can include a swiper (e.g., card reader) integration. The swiper integration can be performed by importing APIs of the payment application driver code to source codes of a POS application and adding to a class supported swiper protocols (e.g., smart chip cards, magnetic stripe cards, near field communication (NFC) capable cards, and PIN capable cards).

At stage 520, referring to FIG. 2A, in response to the first POS application (e.g., the POS application 120A) initiating a first payment transaction, the first integrated application (e.g., the integrated application 130A) can enable a first payment terminal (e.g., the payment terminal 131A) to share a first encryption key with a payment server (e.g., the payment server 200). Similarly, at stage 520, referring to FIG. 2B, in response to the second POS application (e.g., the POS application 120B) initiating a first payment transaction, the second integrated application (e.g., the integrated application 130B) can enable a second payment terminal (e.g., the payment terminal 131B) to share a second encryption key with a payment server (e.g., the payment server 200). For example, the POS application can initiate a payment transaction by passing minimal payment data (e.g., amount, order number or cart details) to the payment application driver code. In response to the POS application initiating a payment transaction, the payment application driver code can enable a payment terminal and initiate communication to the payment terminal. The payment server can share an encryption key with a key distribution manager (e.g., the key distribution manager 150A). In some implementations, the payment server can share base derivation keys (BDK) with the key distribution manager in a Derived Unique Key Per Transaction (DUKPT) key management scheme. In some implementations, the key distribution manager can import component values of the BDK into an HSM (e.g., the HSM 140A).

In some implementations, the key distribution manager can inject all the payment terminals (e.g., the payment terminals 131A and 132A) with applicable encryption keys.

In some implementations, in response to enabling the first payment terminal, the first integrated application can disable other listener processes in the payment client system (e.g., the payment client system 100A in FIG. 2A) from connecting the first payment terminal (e.g., the payment terminal 131A).

In some implementations, the first integrated application can maintain the first memory to be free of any decryption keys corresponding to the first encryption key and any unencrypted data of the first payment data. For example, the integrated application (e.g., the integrated application 130A) does not process or store unencrypted card data on the payment client system. In some implementations, the integrated application does not have access to keys that can decrypt the card data.

At stage 530, referring to FIG. 2A, the first integrated application (e.g., the integrated application 130A) can receive, from the first POS application (e.g., the POS application 120A), first payment data encrypted with the first encryption key. Similarly, at stage 530, referring to FIG. 2B, the second integrated application (e.g., the integrated application 130B) can receive, from the second POS application (e.g., the POS application 120B), second payment data encrypted with the second encryption key. In some implementations, the first payment data includes data selected from the group consisting of tender data, magnetic card reader (MSR) data, personal identification number (PIN) data, and Europay, MasterCard, and Visa (EMV) data. In some implementations, in response to the first payment terminal reading the first payment data, the first integrated application can encrypt the first payment data. In some implementations, the first integrated application can cause the payment terminals (e.g., the payment terminals 131A and 132A) to encrypt payment data including EMV, PIN, MSR data with encryption keys that are received from the payment server via the key distribution manager (e.g., the key distribution manager 150A). For example, a payment terminal can encrypt credit card data including EMV, PIN, MSR data immediately upon swiping or reading the chip. In some implementations, a card is dipped, tapped, or swiped on a payment terminal and the card data read is encrypted at the instance of the interaction.

At stage 540, the first integrated application (e.g., the integrated application 130A in FIG. 2A) can transmit the encrypted first payment data to the payment server for processing the first payment transaction using the encrypted first payment data. For example, referring to FIG. 2A, the payment application driver code 110 can pass encrypted transaction data to the payment server 200. Similarly, at stage 540, the second integrated application (e.g., the integrated application 130B in FIG. 2B) can transmit the encrypted second payment data to the payment server for processing the second payment transaction using the encrypted second payment data. In some implementations, the application payment driver code 110 can communicate the encrypted data collected from the POS application 120A and a P2PE enabled terminal (e.g., the payment terminal 131A). In some implementations, the encrypted data collected from the POS application 120A and a P2PE enabled terminal are securely transmitted to the payment server 200.

In some implementations, during the transmission of the encrypted first payment data and the reception and the reception of the processing result of the first payment transaction, the first integrated application can communicate transaction information including the encrypted first payment data with the payment server using a transport layer security (TLS) protocol. For example, the payment application driver code 110 further can encrypt the transaction data with TLS 1.2 encryption keys. In some implementations, the client system 100 does not transmit any unencrypted card data over a network connection.

At stage 550, referring to FIG. 2A, the first integrated application (e.g., the integrated application 130A) can receive a processing result of the first payment transaction from the payment server (e.g., the payment server 200) and communicate the processing result to the first POS application (e.g., the POS application 120A). Similarly, at stage 550, referring to FIG. 2B, the second integrated application (e.g., the integrated application 130B) can receive a processing result of the second payment transaction from the payment server (e.g., the payment server 200) and communicate the processing result to the second POS application (e.g., the POS application 120B).

Figure 6:
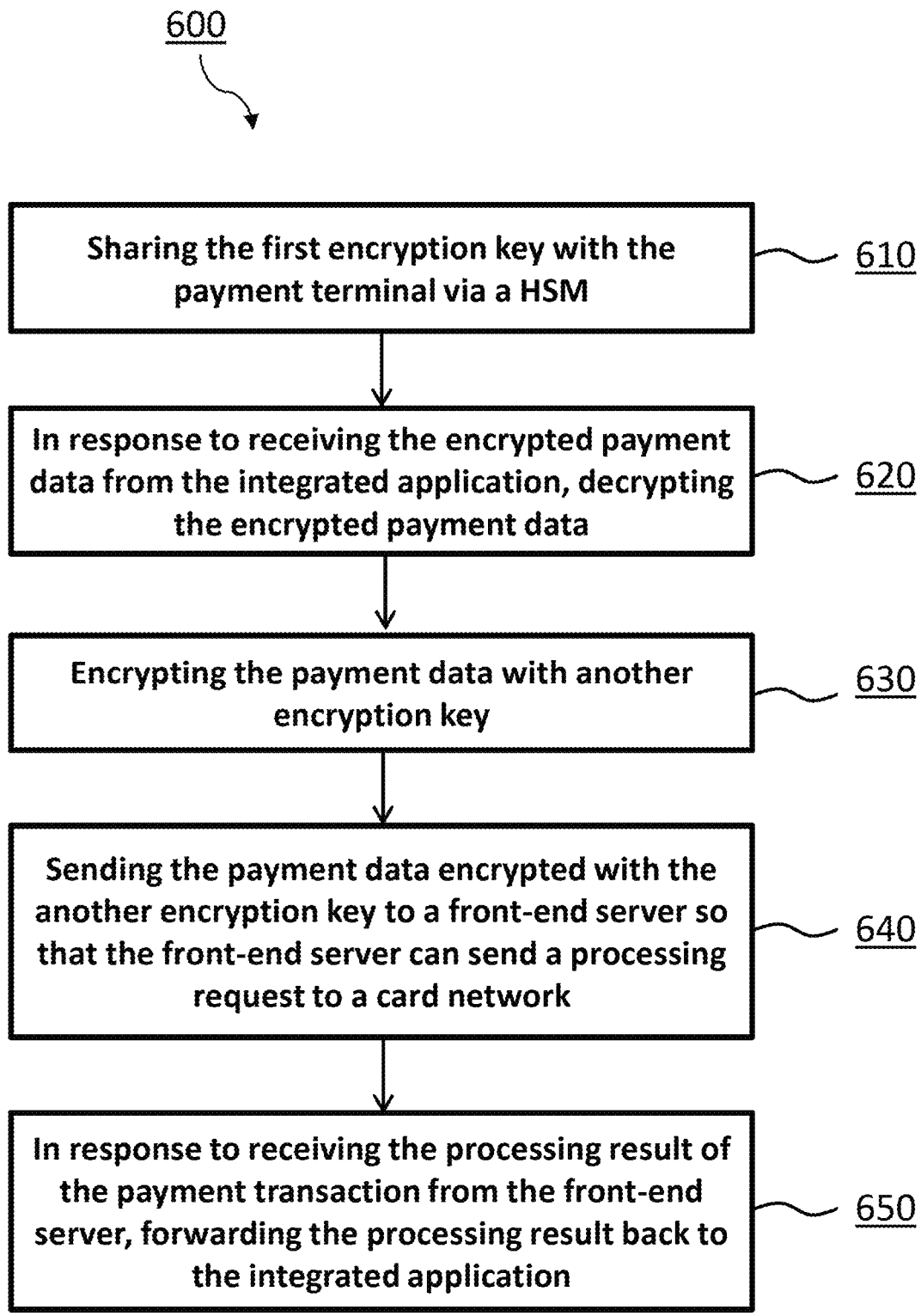
FIG. 6 is a flowchart showing operations of a payment server according to some implementations.

FIG. 6 is a flowchart for payment transaction processing using an example method 600 performed by a payment server, such as the payment servers 200A and 200B shown in FIG. 1 and the payment server 200 shown in FIG. 3. In broad overview, the method 600 begins with stage 610 in which the payment server can share the first encryption key with the first payment terminal via a first hardware security module (HSM). At stage 620, in response to receiving the encrypted first payment data from the first integrated application, the payment server can decrypt the encrypted first payment data. At stage 630, the payment server can encrypt the first payment data with a third encryption key. At stage 640, the payment server can send the first payment data encrypted with the third encryption key to a front-end server. Then, at stage 650, in response to receiving the processing result of the first payment transaction from the front-end server, the payment server can forward the processing result back to the first integrated application.

Now, the flowchart in FIG. 6 will be described in more detail, by referring to FIGS. 1-4.

At stage 610, the payment server (e.g., the payment servers 200A, 200B, 200 in FIGS. 1 and 3) can share the first encryption key with the first payment terminal via a first hardware security module (HSM), such as the HSM 140A in FIG. 2A. In some implementations, referring to FIG. 2A, the HSM 140A can communicate with the payment server to exchange an encryption key that is to be used to encrypt payment data. In some implementations, the key distribution manager 150A (see FIG. 2A) receives an encryption key from the payment server. In some implementations, the distribution manager 150A can store the received encryption key into the HSM 140A or distribute the received encryption key to the payment terminals 131A and 132A.

At stage 620, in response to receiving the encrypted first payment data from the first integrated application, the payment server (e.g., the payment server 200 in FIG. 3) can decrypt the encrypted first payment data. For example, referring to FIG. 3, the payment server 200 can perform a decryption process via the key manager 242 and the HSM 256. In some implementations, the key manager 242 and the HSM 256 can decrypt EMV, MSR, and PIN data. In some implementations, the payment server 200 can decrypt transaction information and transmit the decrypted transaction information to a front-end payment server (e.g., the front-end server 800 in FIGS. 1 and 3) for authorization.

At stage 630, the payment server (e.g., the payment server 200 in FIG. 3) can encrypt the first payment data with a third encryption key. For example, referring to FIG. 3, the key manager 242 and the HSM 256 can encrypt PIN data with a front-end host encryption key, different from the first encryption key used to encrypt payment data at the payment client system.

At stage 640, the payment server (e.g., the payment server 200 in FIG. 3) can send the first payment data encrypted with the third encryption key to a front-end server (e.g., the front-end server 800 in FIG. 3). For example, the payment server 200 can determine an appropriate front-end server via the transaction broker 240 based on the given transaction and send encrypted payment data to the determined front-end server.

In some implementations, in response to receiving the first payment data encrypted with the third encryption key, the front-end server (e.g., the front-end server 800 in FIG. 1) can process the first payment transaction and send a request for processing the first payment transaction to a card network (e.g., the card networks 900 in FIG. 1).

In some implementations, in response to receiving the processing result of the first payment transaction from the card network (e.g., the card networks 900 in FIG. 1), the front-end server can forward the processing result back to the payment server (e.g., the payment server 200A or 200B in FIG. 1).

At stage 650, in response to receiving the processing result of the first payment transaction from the front-end server (e.g., the front-end server 800 in FIGS. 1 and 3), the payment server can forward the processing result back to the first integrated application (e.g., the integrated application 130A in FIG. 2A). For example, referring to FIG. 1, response details from the card networks 900 can be passed back to the integrated application in the payment client 100A through the front-end server 800 and the payment server 200A or 200B. In some implementations, referring to FIG. 2A, in response to receiving response details, the integrated application 130A can pass the receipt details to the POS application 120A and manage integrated circuit card (ICC) data back to the terminal.

In some implementations, the first integrated application is configured to perform operations as required by a particular level of a credit card certification compliance (e.g., EMV level 3 certification), and the second integrated application is configured to perform operations as required by the same level of the credit card certification compliance. For example, referring to FIG. 2A, the integrated application 130A in which the payment application driver code 110 is integrated with the POS application 120A meets the requirements of the EMV level 3 certification. In some implementations, another integrated application (e.g., the integrated application 130B in FIG. 2B) having the same payment application driver code (e.g., the payment application driver code 110) integrated with another POS application (e.g., the POS application 120B in FIG. 2B) also can meet the same requirements of the EMV level 3 certification. In some implementations, the payment client system (e.g., the system 100A in FIG. 2A) including the integrated application 130A can perform end-to-end (E2E) or network operations as required by EMV level 3 certification. For example, referring to FIG. 2A, the payment client system 100A can perform end-to-end (E2E) or network operations through a particular EMV path, e.g., from the level 1 and 2 certified payment terminals 131A and 132A, to the POS application 120A or any middleware or gateway in use, to the payment server 200, and finally to the card network (e.g., the card networks in FIG. 1). In some implementations, the end-to-end (E2E) or network operations can be tested over all possible combinations of each payment terminal, each device the POS application is using, each version of the POS application, each payment server, and each card network.

Referring to FIG. 2A, in addition to meeting all EMV Level 3 compliance requirements, the integrated application 130A can enable PCI-compliant transactions with end-to-end encryption. In some implementations, the integrated application 130A can perform transactional communications with the back-end payment servers (e.g., payment servers 200A and 200B in FIG. 1) and approved hardware devices (e.g., payment terminals 131A and 132A in FIG. 2A) to isolate payment data and keep the payment data separate from the POS application (e.g., the POS application 120A in FIG. 2A).

In the following sections, exemplary technical assessment methods will be described which were used to assess the PCI PA-DSS scope-impact of an integrated application having the payment application driver code integrated with a POS application.

A PCI PA-DSS scope testing was performed as follows. First, analysis of the architecture and configuration of the integrated application was performed. Second, network analysis of transmitted credit card data was performed. Third, forensic analysis of the computer system to determine if credit card data is ever stored on the client system (e.g., the client system 100A in FIG. 2A) or the payment terminal (e.g., the payment terminals 131A and 132A). Fourth, vulnerability testing to identify potential opportunities for compromising the integrated application was performed.

In this section, the assessment environment of the PCI PA-DSS scope testing is described. Regarding the assessment platform, the payment application driver code was installed on a single iPad Mini tablet running iOS 8.4 build 12H143 with full detail. The payment application driver code was integrated with a simple POS application on the same iPad. The POS application only provided a user interface that minimally allowed entry of transaction dollar amount. Regarding the card reader hardware, one card reader attached to the system (e.g., the system 100A in FIG.

2A) was EVO IT-M100 that accepts EMV chip reader and magnetic stripe reader transactions. Regarding the processing center, the system 100A was setup to connect to a payment server (e.g., the payment server 200A in FIG. 1) for testing transaction processing and acceptance response. The EMV chip data on the test card was white-listed for use in testing. The magnetic stripe data was not white listed for testing.

The network traffic assessment (data in transit) was conducted as follows. A Wireshark Ethernet port sniffer was used to monitor traffic coming out of the system with the payment application driver code installed. The captures indicate that no cardholder data is being transmitted over the network in the clear and that no communication of cardholder data or sensitive authentication data to the POS destination IP address occurred. The captures also indicate that the application data that was transmitted was encrypted with TLS 1.2 encryption.

The forensic analysis (data at rest) was conducted as follows. The technical assessment included a forensic examination of the hard drive of the system running the integrated application (e.g., the integrated application 130A in FIG. 2A). The process for examining the platform hard drive for any cardholder data which may have been stored by the solution is as follows: (1) Forensic Tool Kit (FTK) Imager was used to capture an image of the iPad Mini for forensic analysis; and (2) Forensic Tool Kit (FTK), a forensic tool for digital data and media analysis, was used to search the forensic images for key criteria, including cardholder data. As a test result, no findings were identified with the image when searched using Forensic Tool Kit. It is concluded from the forensic analysis that the forensic analysis demonstrates that there is no residual cardholder data on the system running the payment application driver code. After conducting several transactions, the disk image of the testing system was taken and scanned for the evidence of any credit card data or sensitive authentication data. FTK software was used for this forensic analysis and it showed no findings. The interview with the developers and review of the Arrival Manager software confirmed there is no intent to store any credit card data.

The vulnerability assessment was conducted as follows. Using best practices and industry standard vulnerability assessment tools such as Nessus, Ettercap, NMAP, Burp Suite, Python and SSLStrip, a vulnerability scan was performed to determine if the card reader (e.g., the payment terminals 131A and 132A in FIG. 2A) opened any listeners. The result indicates that no additional listeners were created by connecting the card reader to the device. Moreover, attempt to intercept traffic from iPad to the payment server was performed. It was observed that traffic was traversing port 443 and verified as encrypted using command line tools. This shows that attempt to intercept traffic for the purposes of exploitation were unsuccessful. Attempt to force the payment application driver code to accept an invalid certificate that could then be used to decrypt traffic was performed but transactions failed without any data being sent. Attempt to spoof traffic from server to iPad was performed in order to test for disclosure of sensitive information or to gain access. The result shows that all spoofed data was responded with a TCP reset.

In this section and following sections, the result of the PCI PA-DSS scope testing will be summarized. As to a first test whether the system can prevent account data from being intercepted when entered into a mobile device, the result shows that the payment application driver code integrated POS application (e.g., the integrated application 130A in FIG. 2A) does not allow entry of PIN data in an unsecure way through the application. The result also shows that when card holder data is read or PIN entry is made on a compatible device (e.g., the payment terminal 131A, 132A in FIG. 2A), the card reader encrypts the data upon reading of the account data from the card; and the account data does not reside in an unencrypted fashion in memory on the iOS platform device. Moreover, the payment application driver code further encrypts the transaction information in an additional layer of TLS 1.2 encryption. No decryption keys for the card reader, nor the payment application driver code exist on the device).

As to a second test whether the system can prevent account data from compromise while processed or stored within the mobile device, the result shows that the payment application driver code does not store account data on the mobile device either in an encrypted fashion or unencrypted fashion. The payment application driver code only passes the encrypted data through the mobile device and provides no functionality for the merchant to decrypt the data.

As to a third test whether the system can prevent account data from interception upon transmission out of the mobile device, the result shows that in addition to the encryption provided by the compatible card readers (e.g., the payment terminals 131 and 132), the payment application driver code forces a TLS v1.2 connection to the payment server (e.g., the payment servers 200A and 200B in FIG. 1).

In some implementations, the payment application driver code can provide the following advantages. The payment application driver code can be an SDK or an API or a shared library and therefore can be easy to install, similar to installation of a printer driver. The payment application driver code can be pre-certified, thereby decreasing a merchant's time to market. The payment application driver code can meet certain condition (e.g., no cardholder data is stored in merchant's environment) to reduce PCI Compliance scope and liability for merchants. The payment application driver code can be separately maintained (sometimes repaired) from POS applications, thereby incurring no ongoing maintenance costs. The payment application driver code can support both domestic—(e.g., US) and foreign—(e.g., EU) compliant transactions. Finally, the integrated application can facilitate all transactional communication with the payment and approved hardware devices (e.g., the payment terminals 131A and 132A in FIG. 2A) to isolate payment data and keep it separate from the software application. Therefore, the POS applicant may only require simple transaction details such as date, time, and amount and invoice number.

The present disclosure contemplates methods, systems, and program products on any machine-readable media for accomplishing various operations. The examples of the present disclosure may be implemented using existing computer processors, or by a special purpose computer processor for an appropriate system, incorporated for this or another purpose, or by a hardwired system. Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other non-transitory medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

It is important to note that the construction and arrangement of the elements of the systems and methods as shown in the exemplary implementations are illustrative only. Although only a few implementations of the present disclosure have been described in detail, those skilled in the art who review this disclosure will readily appreciate that many modifications are possible without materially departing from the novel teachings and advantages of the subject matter recited. For example, elements shown as integrally formed may be constructed of multiple parts or elements. Accordingly, all such modifications are intended to be included within the scope of the present disclosure. Other substitutions, modifications, changes, and omissions may be made in the design, operating conditions, and arrangement of the implementations described above without departing from scope of the present disclosure or from the spirit of the appended claims.

What is claimed is:

1. A system, comprising:
   a first processor;
   a second processor;
   a first memory; and
   a second memory,
   wherein at least one of the first processor or the second processor is configured to execute a pre-certified payment application driver code configured to satisfy requirements of a required level of a credit card data security certification compliance, wherein
   the first processor is configured to execute instructions storable in the first memory, the instructions being provided by a first integrated application, wherein the first integrated application is generated by the pre-certified payment application driver code, wherein the pre-certified payment application driver code is integrated with a first point of sale (POS) application which executes on the first processor with the first memory and does not satisfy the requirements of the required level of the credit card data security certification compliance,
   the first integrated application, in response to execution of the first integrated application by the first processor, causes the first processor to:
      enable, in response to the first POS application initiating a first payment transaction, a first payment terminal to share a first encryption key with a payment server;
      receive first payment data encrypted with the first encryption key;
      transmit the encrypted first payment data to the payment server for processing the first payment transaction using the encrypted first payment data; and
      receive a processing result of the first payment transaction from the payment server and communicate the processing result to the first POS application, and
   the second processor is configured to execute instructions storable in the second memory, the instructions being provided by a second integrated application, wherein the second integrated application is generated by the pre-certified payment application driver code, wherein the pre-certified payment application driver code is integrated with a second POS application which executes on the second processor with the second memory and does not satisfy the requirements of the required level of the credit card data security certification compliance,
   the second integrated application, in response to execution of the second integrated application by the second processor, causes the second processor to:
      enable, in response to the second POS application initiating a second payment transaction, a second payment terminal to share a second encryption key with the payment server;
      receive second payment data encrypted with the second encryption key;
      transmit the encrypted second payment data to the payment server for processing the second payment transaction using the encrypted second payment data; and
      receive a processing result of the second payment transaction from the payment server and communicate the processing result of the second payment transaction to the second POS application,
   wherein each of the first integrated application and the second integrated application causes one of the first processor or the second processor to perform operations as required by the required level of the credit card data security certification compliance,
   wherein the pre-certified payment application driver code supports multiple payment terminal vendors in one integration,
   wherein the pre-certified payment application driver code, in response to execution of the first integrated application by the first processor, causes the first processor to satisfy the required level of the credit card data security certification compliance, for each of the multiple payment terminal vendors, and
   wherein the pre-certified payment application driver code, in response to execution of the first integrated application by the first processor, causes the first processor to perform end-to-end (E2E) operations from the first payment terminal to the payment server as required by the required level of the credit card data security certification compliance, for each of the multiple payment terminal vendors.

2. The system of claim 1, wherein the pre-certified payment application driver code includes configurable authentication identifiers to selectively implement
   (1) an authentication to use the same authentication identifier across all implementations of the pre-certified payment application driver code,
   (2) an authentication to use authentication identifiers for individual independent software vendors (ISVs),
   (3) an authentication to use authentication identifiers for individual merchants, or
   (4) an authentication to use authentication identifiers for individual applications.

3. The system of claim 1, wherein:
during the transmission of the encrypted first payment data and the reception of the processing result of the first payment transaction, the first integrated application is further configured to communicate transaction information including the encrypted first payment data with the payment server using a transport layer security (TLS) protocol, and
during the transmission of the encrypted second payment data and the reception of the processing result of the second payment transaction, the second integrated application is further configured to communicate transaction information including the encrypted second payment data with the payment server using a TLS protocol.

4. The system of claim 1, wherein the pre-certified payment application driver code is an application programming interface (API).

5. The system of claim 1, wherein the pre-certified payment application driver code is a shared library stored in at least one of the first memory or the second memory.

6. The system of claim 1, wherein:
in response to enabling the first payment terminal, the first integrated application is configured to disable other listener processes in the system from connecting with the first payment terminal, and
in response to enabling the second payment terminal, the second integrated application is configured to disable other listener processes in the system from connecting with the second payment terminal.

7. The system of claim 1, wherein:
the first integrated application is configured to maintain the first memory to be free of any decryption keys corresponding to the first encryption key and any unencrypted data of the first payment data, and
the second integrated application is configured to maintain the second memory to be free of any decryption keys corresponding to the second encryption key and any unencrypted data of the second payment data.

8. The system of claim 1, wherein:
in response to the first payment terminal reading the first payment data, the first integrated application is configured to encrypt the first payment data, and
in response to the second payment terminal reading the second payment data, the second integrated application is configured to encrypt the second payment data.

9. The system of claim 1, wherein:
the first payment data includes data selected from the group consisting of tender data, magnetic card reader (MSR) data, personal identification number (PIN) data, or Europay, MasterCard, or Visa (EMV) data, and
the second payment data includes data selected from the group consisting of tender data, MSR data, PIN data, or EMV data.

10. The system of claim 1, further comprising a first hardware security module (HSM) and a second HSM, wherein:
the first integrated application is configured to cause the first payment terminal to share the first encryption key with the payment server via the first HSM, and
the second integrated application is configured to cause the second payment terminal to share the second encryption key with the payment server via the second HSM.

11. The system of claim 1, wherein the pre-certified payment application driver code is a software development kit (SDK).

12. The system according to claim 1, wherein the pre-certified payment application driver code further supports multiple terminal models and multiple countries in the one integration.

13. The system of claim 1, wherein the required level of the credit card data security certification compliance is level 3 of Europay, MasterCard, and Visa (EMV) certification.

14. A method, comprising:
configuring a payment application driver code as a pre-certified payment application driver code to satisfy requirements of a required level of a credit card data security certification compliance;
generating a first integrated application which provides instructions executable by a first processor of a system with a first memory of the system by integrating the pre-certified payment application driver code with a first point of sale (POS) application which executes on the first processor with the first memory and does not satisfy the requirements of the required level of the credit card data security certification compliance;
in response to the first POS application initiating a first payment transaction, enabling by execution of the first integrated application by the first processor, a first payment terminal to share a first encryption key with a payment server;
receiving by execution of the first integrated application by the first processor, first payment data encrypted with the first encryption key;
transmitting by execution of the first integrated application by the first processor, the encrypted first payment data to the payment server for processing the first payment transaction using the encrypted first payment data;
receiving by execution of the first integrated application by the first processor, a processing result of the first payment transaction from the payment server and communicating the processing result to the first POS application;
performing by execution of the first integrated application by the first processor, operations as required by the required level of the credit card data security certification compliance;
generating a second integrated application which provides instructions executable by a second processor of the system with a second memory of the system by integrating the pre-certified payment application driver code with a second POS application which executes on the second processor with the second memory and does not satisfy the requirements of the required level of the credit card data security certification compliance;
in response to the second POS application initiating a second payment transaction, enabling by execution of the second integrated application by the second processor, a second payment terminal to share a second encryption key with the payment server;
receiving by execution of the second integrated application by the second processor, second payment data encrypted with the second encryption key;
transmitting by execution of the second integrated application by the second processor, the encrypted second payment data to the payment server for processing the second payment transaction using the encrypted second payment data;
receiving by execution of the second integrated application by the second processor, a processing result of the second payment transaction from the payment server and communicating the processing result of the second payment transaction to the second POS application; and performing by execution of the second integrated application by the second processor, operations as required by the required level of the credit card data security certification compliance, wherein the pre-certified payment application driver code supports multiple payment terminal vendors in one integration, wherein the method further comprises:
causing, by the pre-certified payment application driver code, in response to execution of the first integrated application by the first processor, the first processor to satisfy the required level of the credit card data security certification compliance, for each of the multiple payment terminal vendors, and causing, by the pre-certified payment application driver code, in response to execution of the first integrated application by the first processor, the first processor to perform end-to-end (E2E) operations from the first payment terminal to the payment server as required by the required level of the credit card data security certification compliance, for each of the multiple payment terminal vendors.

15. The method of claim 14, further comprising:
selectively performing, via configurable authentication identifiers of the pre-certified payment application driver code,
(1) an authentication to use the same authentication identifier across all applications of the pre-certified payment application driver code,
(2) an authentication to use authentication identifiers for individual independent software vendors (ISVs),
(3) an authentication to use authentication identifiers for individual merchants, or
(4) an authentication to use authentication identifiers for individual applications of the pre-certified payment application driver code.

16. The method of claim 14, further comprising:
communicating by the first integrated application, during the transmission of the encrypted first payment data and the reception of the processing result of the first payment transaction, transaction information including the encrypted first payment data with the payment server using a transport layer security (TLS) protocol, and communicating by the second integrated application, during the transmission of the encrypted second payment data and the reception of the processing result of the second payment transaction, transaction information including the encrypted second payment data with the payment server using a TLS protocol.

17. The method of claim 14, wherein the pre-certified payment application driver code is an application programming interface (API).

18. The method of claim 14, further comprising:
storing the pre-certified payment application driver code as a shared library in at least one of the first memory or the second memory.

19. The method of claim 14, further comprising:
in response to enabling the first payment terminal, disabling by the first integrated application, other listener processes in the system from connecting with the first payment terminal, and
in response to enabling the second payment terminal, disabling by the second integrated application, other listener processes in the system from connecting with the second payment terminal.

20. The method of claim 14, further comprising:
maintaining by the first integrated application, the first memory to be free of any decryption keys corresponding to the first encryption key and any unencrypted data of the first payment data, and
maintaining by the second integrated application, the second memory to be free of any decryption keys corresponding to the second encryption key and any unencrypted data of the second payment data.

21. The method of claim 14, further comprising:
in response to the first payment terminal reading the first payment data, encrypting the first payment data by the first integrated application, and
in response to the second payment terminal reading the second payment data, encrypting the second payment data by the second integrated application.

22. The method of claim 14, wherein:
the first payment data includes data selected from the group consisting of tender data, magnetic card reader (MSR) data, personal identification number (PIN) data, or Europay, MasterCard, or Visa (EMV) data, and
the second payment data includes data selected from the group consisting of tender data, MSR data, PIN data, or EMV data.

23. The method of claim 14, wherein the pre-certified payment application driver code is a software development kit (SDK).

24. A method, comprising:
configuring a payment application driver code as a pre-certified payment application driver code to satisfy requirements of a required level of a credit card data security certification compliance;
generating a first integrated application which provides instructions executable by a first processor of a system with a first memory of the system by integrating the pre-certified payment application driver code with a first point of sale (POS) application which does not satisfy the requirements of the required level of the credit card data security certification compliance;
in response to the first POS application initiating a first payment transaction, enabling by execution of the first integrated application by the first processor, a first payment terminal to share a first encryption key with a payment server;
receiving by execution of the first integrated application by the first processor, first payment data encrypted with the first encryption key;
transmitting by execution of the first integrated application by the first processor, the encrypted first payment data to the payment server for processing the first payment transaction using the encrypted first payment data;
receiving by execution of the first integrated application by the first processor, a processing result of the first payment transaction from the payment server and communicating the processing result to the first POS application;
performing by execution of the first integrated application by the first processor, operations as required by the required level of the credit card data security certification compliance;
generating a second integrated application which provides instructions executable by a second processor of the system with a second memory of the system by integrating the pre-certified payment application driver code with a second POS application which does not satisfy the requirements of the required level of the credit card data security certification compliance;

in response to the second POS application initiating a second payment transaction, enabling by the second integrated application, a second payment terminal to share a second encryption key with the payment server;

receiving by execution of the second integrated application by the second processor, second payment data encrypted with the second encryption key;

transmitting by execution of the second integrated application by the second processor, the encrypted second payment data to the payment server for processing the second payment transaction using the encrypted second payment data;

receiving by execution of the second integrated application by the second processor, a processing result of the second payment transaction from the payment server and communicating the processing result of the second payment transaction to the second POS application;

performing by execution of the second integrated application by the second processor, operations as required by the required level of the credit card data security certification compliance;

sharing by the payment server, the first encryption key with the first payment terminal via a first hardware security module (HSM);

in response to receiving the encrypted first payment data from the first integrated application, decrypting by the payment server, the encrypted first payment data;

encrypting by the payment server, the first payment data with a third encryption key and sending the first payment data encrypted with the third encryption key to a front-end server;

in response to receiving the first payment data encrypted with the third encryption key, processing by the front-end server, the first payment transaction and sending a request for processing the first payment transaction to a card network;

in response to receiving a processing result of the first payment transaction from the card network, forwarding by the front-end server, the processing result back to the payment server;

in response to receiving the processing result of the first payment transaction from the front-end server, forwarding by the payment server, the processing result back to the first integrated application;

sharing by the payment server, the second encryption key with the second payment terminal via a second HSM;

in response to receiving the encrypted second payment data from the second integrated application, decrypting by the payment server, the encrypted second payment data;

encrypting by the payment server, the second payment data with a fourth encryption key;

sending by the payment server, the second payment data encrypted with the fourth encryption key to the front-end server;

in response to receiving the second payment data encrypted with the fourth encryption key, processing by the front-end server, the second payment transaction and sending a request for processing the second payment transaction to the card network;

in response to receiving a processing result of the second payment transaction from the card network, forwarding by the front-end server, the processing result back to the payment server; and in response to receiving the processing result of the second payment transaction from the front-end server, forwarding by the payment server, the processing result back to the second integrated application, wherein the pre-certified payment application driver code supports multiple payment terminal vendors in one integration, wherein the method further comprises:

causing, by the pre-certified payment application driver code, in response to execution of the first integrated application by the first processor, the first processor to satisfy the required level of the credit card data security certification compliance, for each of the multiple payment terminal vendors, and causing, by the pre-certified payment application driver code, in response to execution of the first integrated application by the first processor, the first processor to perform end-to-end (E2E) operations from the first payment terminal to the payment server as required by the required level of the credit card data security certification compliance, for each of the multiple payment terminal vendors.

25. A system, comprising:

a processor; and a memory, wherein the first processor is configured to execute a pre-certified payment application driver code configured to satisfy requirements of a required level of a credit card data security certification compliance, wherein the processor is configured to execute instructions storable in the memory, the instructions being provided by a first integrated application, wherein the first integrated application is generated by the pre-certified payment application driver code, wherein the pre-certified payment application driver code is integrated with a first point of sale (POS) application which executes on the processor with the memory and does not satisfy the requirements of the required level of the credit card data security certification compliance, and the first integrated application, in response to execution of the first integrated application by the processor, causes the processor to:

enable, in response to the first POS application initiating a first payment transaction, a first payment terminal to share a first encryption key with a payment server;

receive first payment data encrypted with the first encryption key;

transmit the encrypted first payment data to the payment server for processing the first payment transaction using the encrypted first payment data;

receive a processing result of the first payment transaction from the payment server and communicate the processing result to the first POS application; and perform operations as required by the required level of the credit card data security certification compliance, wherein the pre-certified payment application driver code supports multiple payment terminal vendors in one integration, wherein the pre-certified payment application driver code, in response to execution of the first integrated application by the processor, causes the processor to satisfy the required level of the credit card data security certification compliance, for each of the multiple payment terminal vendors, and wherein the pre-certified payment application driver code, in response to execution of the first integrated application by the processor, causes the processor to perform end-to-end (E2E) operations from the first payment terminal to the payment server as required by the required level of the credit card data security certification compliance, for each of the multiple payment terminal vendors.

26. The system of claim 25, wherein the pre-certified payment application driver code is an application programming interface (API).

27. The system of claim 25, wherein the pre-certified payment application driver code is a software development kit (SDK).

\* \* \* \* \*